(12) United States Patent
Noguero

(10) Patent No.: US 6,422,177 B1
(45) Date of Patent: Jul. 23, 2002

(54) DECORATIVE COLLAR AND METHOD OF ALTERING THE APPEARANCE OF A COLLAR

(76) Inventor: Elena M. Noguero, 3015 W. Michigan Ave., Phoenix, AZ (US) 85053

( * ) Notice: Subject to any disclaimer, the term of this patent is extended or adjusted under 35 U.S.C. 154(b) by 0 days.

(21) Appl. No.: 09/695,589

(22) Filed: Oct. 23, 2000

(51) Int. Cl.[7] .......................... A01K 27/00; A62B 35/00
(52) U.S. Cl. ...................... 119/856; 119/858; D30/152
(58) Field of Search ...................... 119/856, 858; D30/152; D2/600, 627, 629; 54/24

(56) References Cited

U.S. PATENT DOCUMENTS

| | | | | |
|---|---|---|---|---|
| 2,880,701 A | * | 4/1959 | Foster | 119/858 |
| D228,646 S | * | 10/1973 | Kissin | 119/856 |
| 3,765,376 A | * | 10/1973 | Higgins | 119/856 |
| 3,848,270 A | * | 11/1974 | Rand | D2/627 |
| 4,266,511 A | * | 5/1981 | Muench | 119/858 |
| 4,407,233 A | * | 10/1983 | Bozzacco | 119/858 |
| 5,109,803 A | * | 5/1992 | Dunham et al. | 119/654 X |
| D346,885 S | * | 5/1994 | Milo et al. | D30/152 |
| D377,245 S | * | 1/1997 | Norman et al. | D30/152 |
| 5,865,148 A | * | 2/1999 | Aguirre et al. | 119/856 |
| D436,698 S | * | 1/2001 | Noguero | D30/152 |
| 6,289,903 B1 | * | 9/2001 | Haufler | 119/858 |

* cited by examiner

Primary Examiner—Charles T. Jordan
Assistant Examiner—Elizabeth Shaw
(74) Attorney, Agent, or Firm—Parsons & Goltry; Robert A. Parsons; Michael W. Goltry

(57) ABSTRACT

Collar apparatus comprising an elongate band engagable so as to be worn and having an appearance and decorative apparatus engagable with the collar for altering the appearance of the collar.

9 Claims, 3 Drawing Sheets

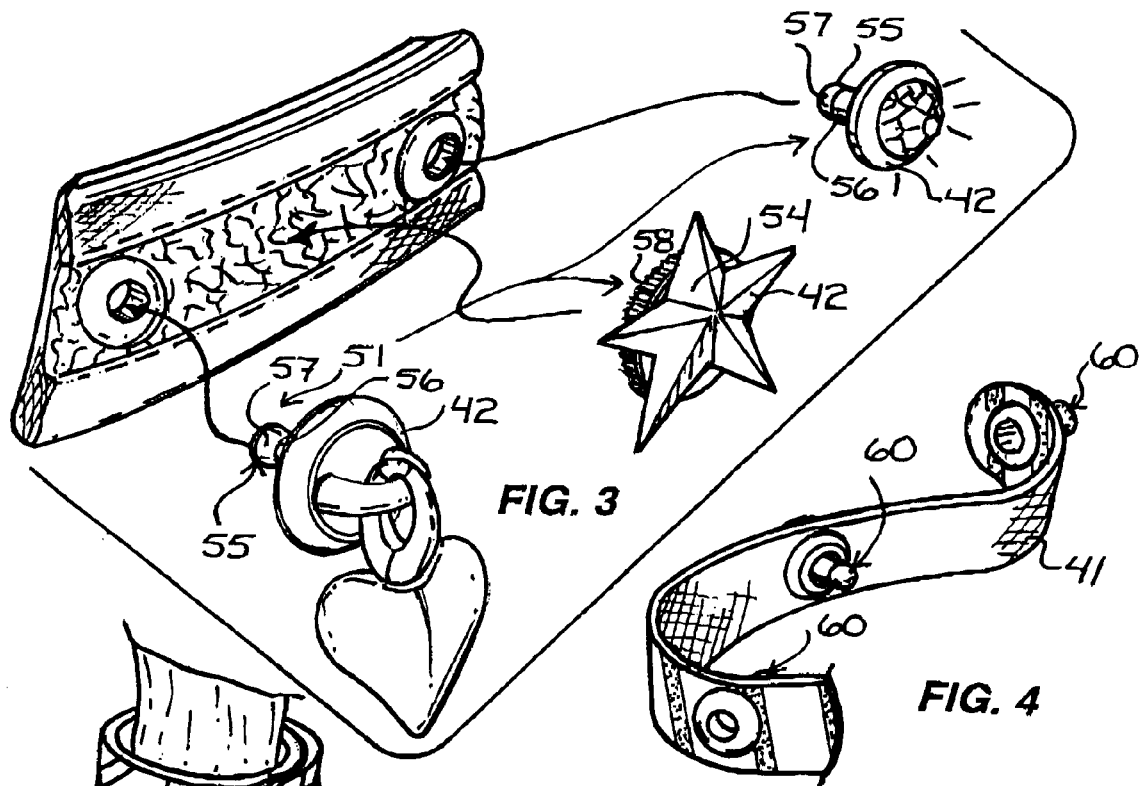
FIG. 3
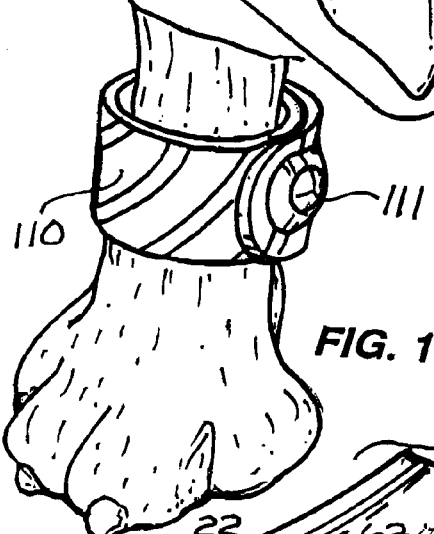
FIG. 11
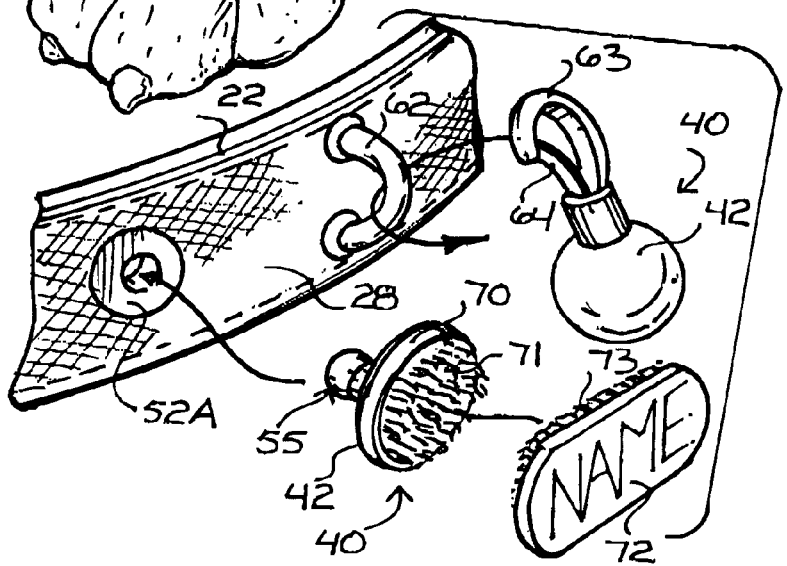
FIG. 7
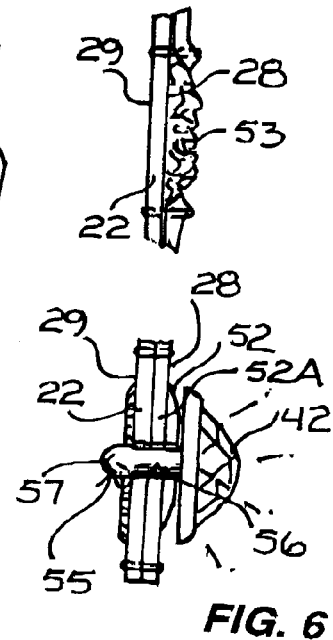
FIG. 4
FIG. 5
FIG. 6

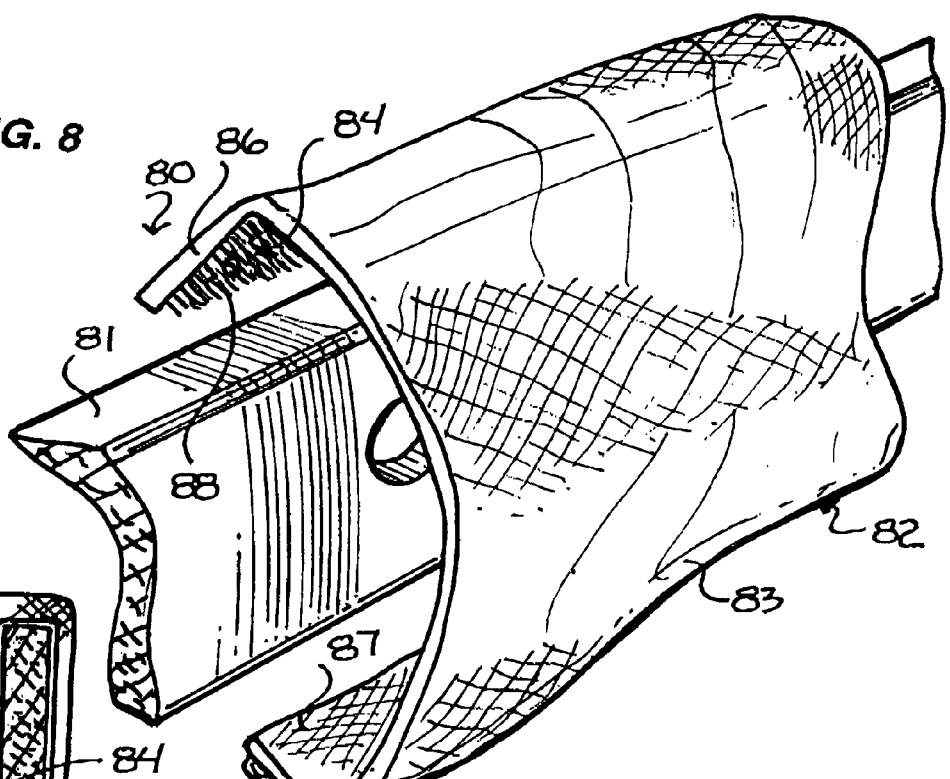
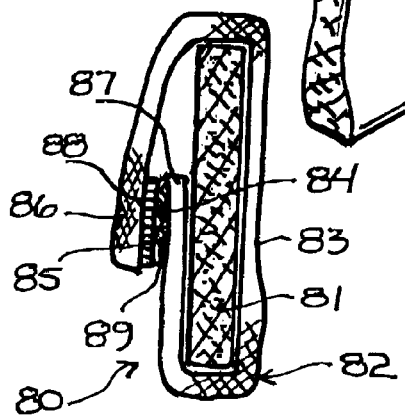
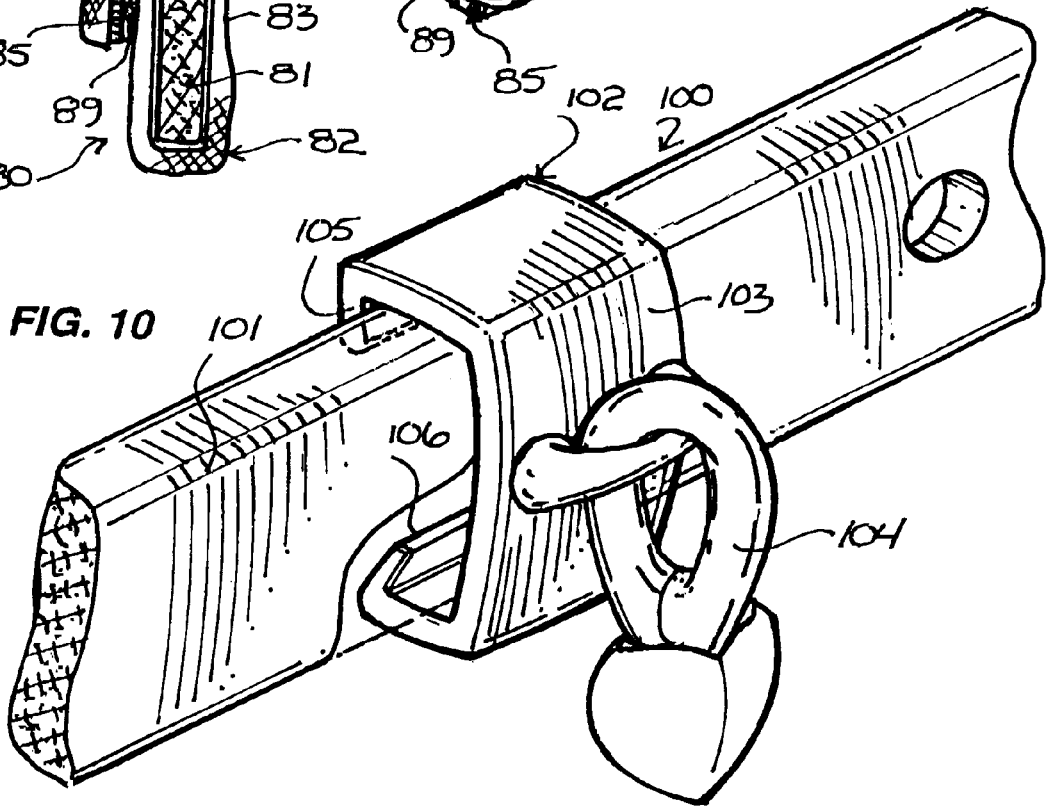

DECORATIVE COLLAR AND METHOD OF ALTERING THE APPEARANCE OF A COLLAR

FIELD OF THE INVENTION

This invention relates generally to collars of the type engagable so as to be worn and, more particularly, to decorative collar apparatus and a method of altering the appearance of a collar.

BACKGROUND OF THE INVENTION

People who own pets, such as cats and dogs, normally fasten a collar around the neck of the pet that support, for instance, identification tags, license tags and vaccination tags. Collars of the foregoing type are normally constructed of nylon or leather and may be found in a variety of colors and dimensions. Prior art collars typically comprise structure based primarily on function rather than ornamentation. Because a need exists among pet owners to allow the alteration of the appearance of their pet collars should the need or desire arise, the need for certain new and useful structural innovations to pet collars is apparent.

Accordingly, it would be highly desirable to provide new and improved collar apparatus and methods of allowing pet owners to alter the physical appearance of their pet collars should the need or desire arise.

It is a purpose of the present invention to provide new and improved collar apparatus that is easy to construct.

It is another purpose of the present invention to provide new and improved collar apparatus that is easy to use.

It is still another purpose of the present invention to provide new and improved collar apparatus that is inexpensive.

It is a further purpose of the present invention to provide new and improved collar apparatus that allows a user to alter the physical appearance of a collar.

SUMMARY OF THE INVENTION

The above problems and others are at least partially solved and the above purposes and others are realized in new and improved collar apparatus and a new and improved method of altering the appearance of a collar. In a particular embodiment, collar apparatus of the present invention may generally comprise an elongate band engagable so as to be worn and having an appearance, and decorative apparatus engagable with the elongate band for altering the appearance of the elongate band. In a specific embodiment, the decorative apparatus may comprise a cover engagable with the elongate band in a wrapped condition. The cover may include an engagement element and an engagable complemental engagement element for securing the cover with the elongate band in the wrapped condition. In other embodiments, the decorative apparatus comprises one of a decorative elongate member and one or more of a plurality of decorative ornaments.

In general, collar apparatus of the present invention further includes engagement apparatus carried by one of the elongate band and the decorative apparatus, and engagable complemental engagement apparatus carried by the other one of the elongate band and the decorative apparatus. The one of the engagement apparatus and the complemental engagement apparatus carried by the elongate band may extend along one of substantially the entire length of the elongate band if desired, and substantially the entire length of the elongate band and at spaced intervals along a predetermined length of the elongate band.

BRIEF DESCRIPTION OF THE DRAWINGS

The foregoing and further and more specific objects and advantages of the instant invention will become readily apparent to those skilled in the art from the following detailed description thereof taken in conjunction with the drawings in which:

FIG. 3 is a fragmented perspective view of collar apparatus of FIG. 1 showing decorative apparatus spaced from the elongate band;

FIG. 4 is a perspective view of the decorative elongate member of FIG. 2 carrying a specific embodiment of complemental engagement apparatus;

FIG. 5 is a sectional view taken along line 5—5 of FIG. 2;

FIG. 6 is a sectional view taken along line 6—6 of FIG. 2;

FIG. 7 is a fragmented perspective view of specific embodiments of engagement and complemental engagement apparatus with decorative apparatus shown spaced from an elongate band;

FIG. 8 is a fragmented perspective view of another embodiment of collar apparatus comprising an elongate band engagable so as to be worn by an animal and decorative apparatus comprising a cover engagable with the elongate band for altering the appearance of the elongate band;

FIG. 9 is a vertical sectional view showing the cover of FIG. 8 as it would appear fastened with the elongate band of FIG. 8;

FIG. 10 is a fragmented perspective view of yet another embodiment of collar apparatus comprising an elongate band engagable so as to be carried by an animal and decorative apparatus comprising a decorative ornament supported by a clip carried by the elongate band; and FIG. 11 is a perspective view of an embodiment of decorative bracelet shown engaged and worn about a leg of an animal.

DETAILED DESCRIPTION OF A PREFERRED EMBODIMENT

The present invention provides, among other things, collar apparatus and a method of altering the appearance of a collar of a type engagable so as to be worn or carried such as around the neck or leg of an animal. Ensuing embodiments of the present invention are easy to construct, easy to implement and use with conventional collars, and provide users with a variety of ways to alter the appearance of a collar should the need or desire arise.

Figure 1:
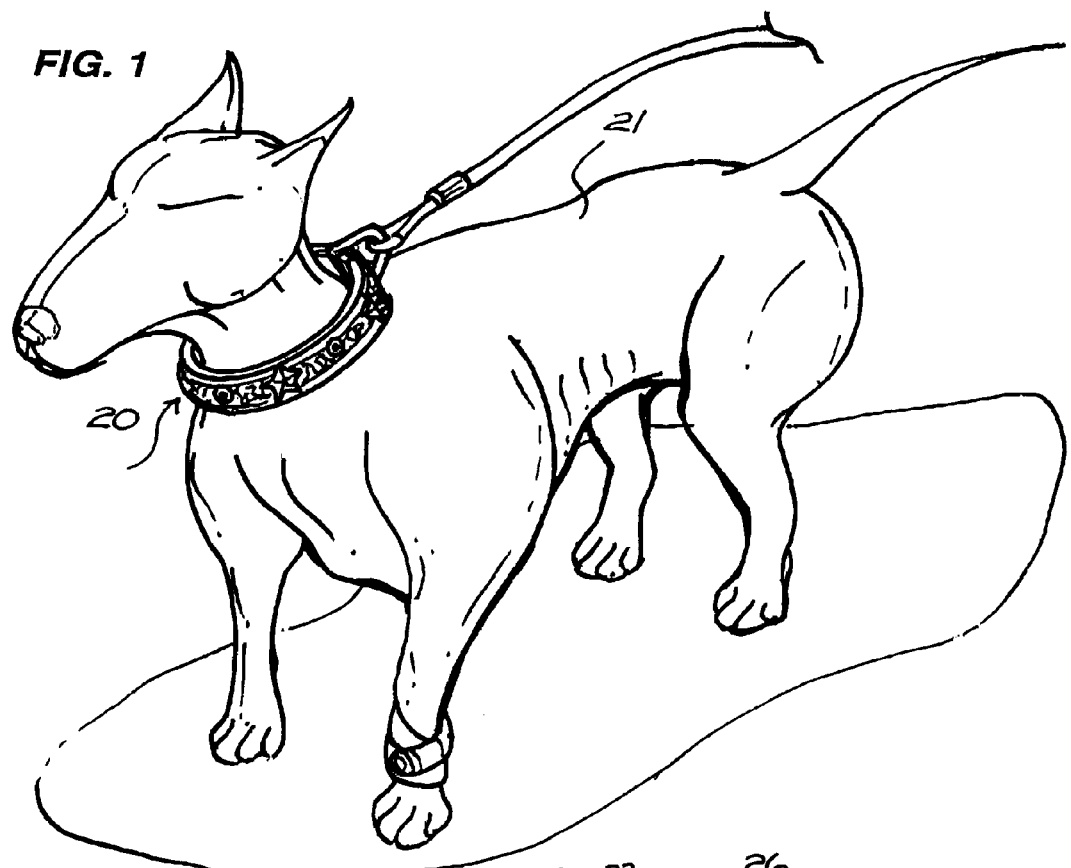
FIG. 1 is a perspective view illustrating collar apparatus shown as it would appear engaged so as to be worn by an animal, collar apparatus comprising an elongate band having engagement apparatus and decorative apparatus having engagable complemental engagement apparatus so as to alter the appearance of the elongate band.
Figure 2:
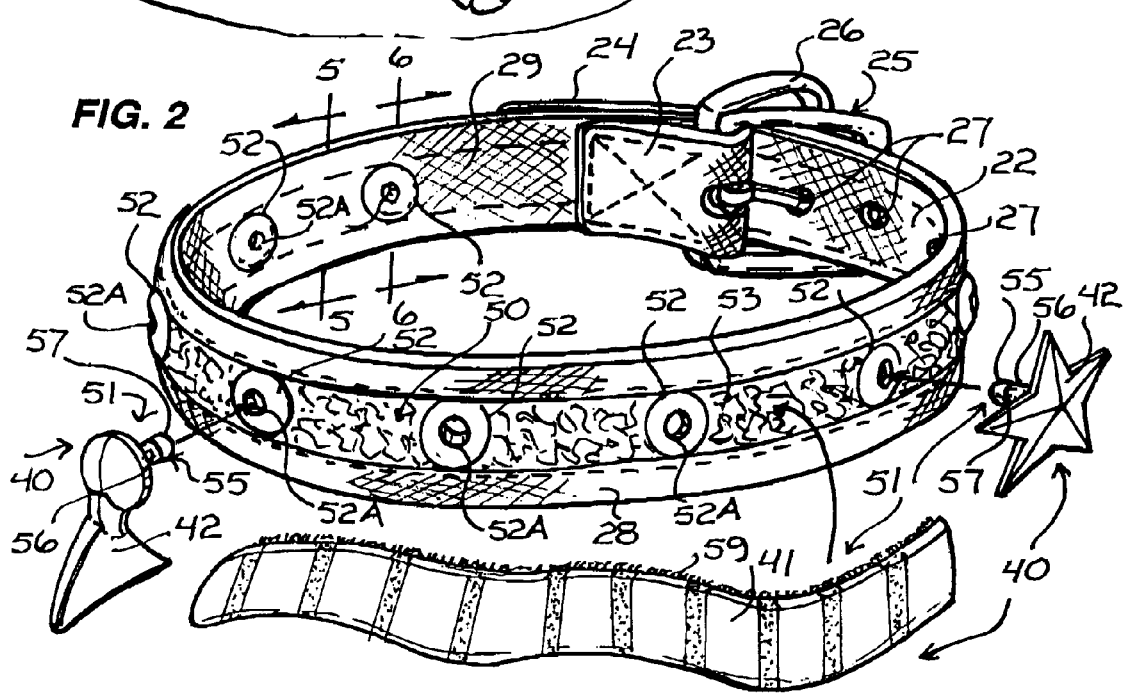
FIG. 2 is a perspective view of collar apparatus of FIG. 1 with decorative apparatus shown spaced from the elongate band, decorative apparatus comprising one or more of a decorative elongate member and one or more of a plurality of decorative ornaments.

Turning now to the drawings, in which like reference characters indicate corresponding elements throughout the several views, attention is first directed to FIG. 1 illustrating a perspective view of a collar assembly or apparatus 20 shown as it would appear engaged so as to be worn or carried about the neck of an animal 21. Turning to FIG. 2, collar apparatus comprises an elongate band 22 including first and second free ends 23 and 24. Elongate band 22 carries fastening apparatus 25 so as to cause elongate band 22 to be engaged in a continuous condition. Fastening apparatus 25 includes a conventional buckle 26 engagable with a selected one of a plurality of apertures 27 carried by elongate band 22 at spaced intervals, although other fastening structure may be used. For the purposes of orientation, elongate band 22 is generally intended to include an outer or first major surface 28, an inner or second major surface 29, and an appearance.

With continuing attention directed to FIG. 2, collar apparatus 20 further includes decorative apparatus generally designated by the reference character 40 and selectively engagable with elongate band 22 so as to alter the appearance of elongate band 22 and, more particularly, the appearance of first major surface 28. In accordance with the teachings of the present invention, decorative apparatus 40 comprises one of an elongate member 41 and one or more of a plurality of ornaments also shown in FIG. 3 and each designated by the reference character 42. Elongate member 41 and ornaments 42 each express decoration or ornamentation such that when engaged with elongate band 22 change or otherwise alter the general appearance of elongate band 22 and, more particularly, the general appearance of first major surface 28.

To engage selectively one or more of elongate member 41 and one or more of ornaments 42 with elongate band 22 as desired, collar apparatus further includes engagement apparatus 50 carried by elongate band 22 and engagable complemental engagement apparatus carried by elongate member 41 and ornaments 42, complemental engagement apparatus being collectively referred to by the reference character 51. It will be understood that engagement apparatus 50 may be carried by decorative apparatus 40 and complemental engagement apparatus 51 carried by elongate band 22 if desired. In the present embodiment, and with additional reference to FIG. 3, engagement apparatus 50 comprises one or more of a plurality of female engagement elements 52 carried by elongate band 22 at spaced intervals along substantially the entire length of elongate band 22 from first free end 23 to second free end 24, and a loop medium 53 (also shown in FIG. 5) carried by first major surface 29 and extending along substantially the entire length of elongate band 22 from first free end 23 to second free end 24. Each female engagement element 52 comprises an eyelet 52A, and loop medium 53 is a material commonly found under the exemplary trademark VELCRO® and of which may be fastened with first major surface 28 with a suitable adhesive, etc.

With the exception of the one of ornaments 42 having the star-shaped body 54 in FIG. 3, complemental engagement apparatus 51 carried by each one of ornaments 42 comprises a male engagement element 55. Each male engagement element 55 includes an elongate shaft 56 extending outwardly from each ornament 42 terminating with an enlarged free end 57. Securing one or more of the ornaments 42 having male engagement element 55 with elongate band 22 involves presenting the male engagement element 55 to elongate band 22 in a direction toward the first major surface 28 and inserting and forcing the enlarged free end 57 of the male engagement element 55 into and through one of eyelets 52. Once inserted as shown in FIG. 6, the given ornament 42 will be secured against first major surface 28 of elongate band 22 with enlarged free end 57 shown positioned adjacent second major surface 29, operative for inhibiting male engagement element 55 from disengaging from the eyelet 52A when collar apparatus 20 is worn. To remove the given ornament 42 from the female engagement element 52, the foregoing operation need only be reversed.

Regarding FIG. 3, complemental engagement apparatus may alternatively comprise, as shown in combination with the ornament having star-shaped body 54, a loop medium 58 commonly found under the exemplary trademark VELCRO®. To mount the star-shaped body 54 ornament 42, one need only engage loop medium 58 with hook medium 53 at a selected position along elongate band 22.

Complemental engagement apparatus 51 carried by elongate member 41 comprises, as shown in FIG. 2, a loop medium 59 also commonly found under the exemplary trademark VELCRO®. To mount elongate member 41 with elongate band 22, one need only engage loop medium 59 with hook medium 53 at a selected position along elongate band 22. Elongate member 41 is preferably constructed of a substantially pliant material to allow it to take the shape of elongate band 22. As an alternative to loop medium 59, elongate member 41 may be provided as male engagement elements 60 carried at spaced intervals along elongate member 41 as shown in FIG. 4, each male engagement element 60 having substantially the same construction as each male engagement element 55 previously discussed and each engagable with an eyelet 52A in the same manner. It will be generally understood that elongate member 41 may be constructed of a length substantially coextensive with elongate band 22 or other desired length.

It will be generally understood that a variety of fastening mechanisms, such as conventional snap fasteners and the like, may comprise engagement apparatus 50 and complemental engagement apparatus 51. For instance, and with attention directed to FIG. 7, engagement apparatus 50 may comprise a gusset 62 fastened to first major surface 28 of elongate band 22, and complemental engagement apparatus 51 carried by ornament 42 a hook 63 having a spring element 64 movable between a first position for opening hook 63 to allow engagement with gusset 62 and a normal second position for closing hook 63 for retention to gusset 62.

Also in FIG. 7, shown is a specific embodiment of an ornament 42 comprising a carrier 70 having male engagement element 55 for receipt into the opposing eyelet 52A, and a loop medium 71 carried opposite male engagement element 55. Also included is a decorative tag 72, such as a name tag, having a hook medium 73 engagable with loop medium 71. In this regard, male engagement element 55 of carrier 70 may be inserted into eyelet 52A and loop and hook media 71 and 73 engaged for securing decorative tag 72 with carrier 70 adjacent first major surface 28. Loop and hook media 71 and 73 define structure commonly found under the exemplary trademark VELCRO® and their orientations may be reversed.

Turning now to FIG. 8, illustrated is a fragmented perspective view of another embodiment of collar apparatus 80 comprising an elongate band 81 having substantially the same construction as elongate band 22 and an appearance, and decorative apparatus 82 engagable with elongate band 81 to alter the appearance of elongate band 81. In this embodiment decorative apparatus 82 comprises a cover 83 constructed of a substantially pliant material so as to be engaged with elongate band 81 in a wrapped condition as generally illustrated for substantially engulfing substantially the entire length, or a predetermined length, of elongate band 81. It will be generally understood that cover 82 expresses decoration or ornamentation bearing an appearance different from the appearance of elongate band 81 such that when engaged with elongate band 81 in the wrapped condition, alters all or part of the appearance of elongate band 81.

To secure cover 83 in the wrapped condition as shown in FIG. 9, cover 83 may be provided with an engagement element 84 and an engagable complemental engagement element 85 each carried adjacent one of free ends 86 and 87 of cover 83. In this specific example, engagement element 84 includes a hook medium 88 and complemental engagement element 85 includes a loop medium 89, each commonly found under the exemplary trademark VELCRO® and each of which may be reversed. Other conventional fastening mechanisms may be used if desired.

Turning now to FIG. 10, illustrated is a fragmented perspective view of another embodiment of collar apparatus 100 comprising an elongate band 101 having substantially the same construction as elongate band 22 and an appearance, and decorative apparatus 102 engagable with elongate band 101 to alter the appearance of elongate band 81. In this embodiment decorative apparatus 102 comprises a clip 103 engagable with elongate band 101 and a decorative ornament 104 carried by clip 103. In this specific embodiment, clip 103 is substantially C-shaped, includes opposing free ends 105 and 106 and may slipped onto collar 101 from a free end thereof. Alternatively, clip may be constructed of plastic or thin metal to allow a user to deform it onto collar 101. Regardless of how a user installs clip 103 onto collar 101, it is nevertheless preferable to construct clip 103 of a deformable material so then when installed onto collar, free ends 105 and 106 may be deformed to pinch against collar 101 to hold decorative apparatus 102 in place at a selected position.

The present invention has been described above with reference to a preferred embodiment. However, those skilled in the art will recognize that changes and modifications may be made in the described embodiments without departing from the nature and scope of the present invention. For instance, FIG. 11 is a perspective view of an embodiment of decorative bracelet 110 shown engaged, such as by a conventional snap fastener 111, and worn about a leg of an animal. Decorative bracelet 110 may be constructed having ornamentation designed to match the various embodiments of the decorative apparatus of the present invention as described herein. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A pet collar kit having component part capable of being assembled comprising:
    an elongate band having first and second ends, at least one aperture carried by one of the first and second ends, a detachably engagable buckle carried by the other of the first and second ends and outer surface;
    first ornaments adapted to be removably engaged to the elongate band along substantially the entire length of the elongate band from the first end to the second end and in direct and substantial opposition to the outer surface; and
    second ornaments adapted to be removably engaged to the elongate band along substantially the entire length of the elongate band from the first end to the second end and in direct and substantial opposition to the outer surface;
    the outer surface of the elongate band substantially from the first end to the second end movable between a) a first decorative condition comprising the first ornaments engaged to the elongate band along substantially the entire length of the elongate band from the first end to the second end and in direct and substantial opposition to the outer surface and b) a second decorative condition comprising the second ornaments engaged to the elongate band along substantially the entire length of the elongate band from the first end to the second end and in direct and substantial opposition to the outer surface.

2. The kit of claim 1, further including:
    engagement apparatus carried by the elongate band;
    first detachably engagable complemental engagement apparatus carried by each of the first group of ornaments; and
    second detachably engagable complemental engagement apparatus carried by each of the second group of ornaments.

3. The kit of claim 2, wherein the engagement apparatus comprises one of a hook and loop medium extending along substantially the entire length of the elongate band from the first end to the second end.

4. The kit of claim 3, wherein the first detachably engagable complemental engagement apparatus comprises the other of the hook and loop medium.

5. The kit of claim 3, wherein the second detachably engagable complemental engagement apparatus comprises the other of the hook and loop medium.

6. The kit of claim 2, wherein the engagement apparatus comprises a plurality of engagement elements supported by the elongate band at spaced intervals along substantially the entire length of the elongate band from the first end to the second end.

7. The kit of claim 6, wherein the first detachably engagable complemental engagement apparatus comprises a plurality of complemental engagement elements each carried by one of the first ornaments and each detachably engagable to at least one of the plurality of engagement elements.

8. A method of adorning a pet collar with ornamentation, the pet collar including an elongate band having first and second ends, at least one aperture carried by one of the first and second ends, a detachably engagable buckle carried by the other of the first and second ends and an outer surface, the method comprising the steps of:
    providing first ornaments adapted to be removably engaged to the elongate band along substantially the entire length of the elongate band from the first end to the second end and in direct and substantial opposition to the outer surface;
    providing second ornaments adapted to be removably engaged to the elongate band along substantially the entire length of the elongate band from the first end to the second end and in direct and substantial opposition to the outer surface;
    placing the outer surface of the elongate band substantially from the first end to the second into a first decorative condition by engaging the first ornaments to the elongate band along substantially the entire length of the elongate band from the first end to the second end and in direct and substantial opposition to the outer surface; and placing the outer surface of the elongate band substantially from the first end to the second end into a second decorative condition by removing the first ornaments from the elongate band and engaging the second ornaments to the elongate band along substantially the entire length of the elongate band from the first end to the second end and in direct and substantial opposition to the outer surface.

9. In a pet collar including an elongate band having a) first and second ends, b) at least one aperture carried by one of the first and second ends, c) a detachably engagable buckle carried by the other of the first and second ends, d) an outer surface, and e) first ornaments removably engaged to the elongate band along substantially the entire length of the elongate band from the first end to the second end and in direct and substantial opposition to the outer surface, a method of changing the appearance of the outer surface of the elongate band comprising the steps of:

providing second ornaments adapted to be removably engaged to the elongate band along substantially the entire length of the elongate band from the first end to the second end and in direct and substantial opposition to the outer surface; and placing the outer surface of the elongate band substantially from the first end to the second end into a second decorative condition by removing the first ornaments from the elongate band and engaging the second ornaments to the elongate band along substantially the entire length of the elongate band from the first end to the second end and in direct and substantial opposition to the outer surface.

* * * * *

UNITED STATES PATENT AND TRADEMARK OFFICE
CERTIFICATE OF CORRECTION

PATENT NO. : 6,422,177 B1  
DATED : July 23, 2002  
INVENTOR(S) : Elena M. Noguero It is certified that error appears in the above-identified patent and that said Letters Patent is hereby corrected as shown below:

<u>Title page,</u>
Add,
-- Related U.S. Application Data
(63)  Continuation of Application No. 09/195,866, filed on Nov. 19, 1998, now abandoned. --

Signed and Sealed this

Twelfth Day of November, 2002

*Attest:*

JAMES E. ROGAN
*Director of the United States Patent and Trademark Office*

*Attesting Officer*